United States Patent [19]

Takegami et al.

[11] 3,986,807
[45] Oct. 19, 1976

[54] BLOW MOLDING APPARATUS

[75] Inventors: Kazuo Takegami; Hayato Doi, both of Osaka, Japan

[73] Assignee: Hitachi Shipbuilding & Engineering Co., Ltd., Osaka, Japan

[22] Filed: Sept. 19, 1974

[21] Appl. No.: 507,261

[30] Foreign Application Priority Data
Oct. 3, 1973 Japan.............................. 48-111708
Oct. 3, 1973 Japan.............................. 48-111710

[52] U.S. Cl. .................................... 425/307; 264/99; 264/151; 425/302 B; 425/305 B; 425/387 B
[51] Int. Cl.² ...................... B29C 17/14; B29D 23/03
[58] Field of Search ............ 425/326 B, 306, 242 B, 425/387 B, 302 B, 305 B, 130, 340, 395, 307, DIG. 208, DIG. 203, DIG. 210, DIG. 211, DIG. 216, DIG. 212; 264/99, 151

[56] References Cited
UNITED STATES PATENTS

| | | | |
|---|---|---|---|
| 2,819,490 | 1/1958 | Froot ......................... | 425/DIG. 208 |
| 3,243,847 | 4/1966 | Fogelberg ...................... | 425/326 B |
| 3,763,297 | 10/1973 | Del Piero et al. ............... | 425/326 B |
| 3,809,521 | 5/1974 | La Fosse .................... | 425/DIG. 206 |

Primary Examiner—Richard B. Lazarus
Assistant Examiner—Robert J. Charvat
Attorney, Agent, or Firm—Farley, Forster and Farley

[57] ABSTRACT

A plurality of molds, each consisting of a pair of relatively movable mold halves, are mounted on a turntable equidistant from the center of turntable rotation, and are moved successively through a receiving sector where they engage and grip a workpiece such as a heated tube fed tangentially to the circular path of movement of the molds. Positioning pillars located on each side of a workpiece cutting device mounted between adjacent molds, engage the workpiece and correct the attitude thereof relative to each receiving mold and to each cutting device, which also is equipped with means for gripping the cut ends of the workpiece when each mold is opened at the end of the molding cycle. A reciprocating mechanism enables the center of turntable rotation to be moved toward and away from the tangential workpiece feeding path in synchronism with the movement of each mold through the workpiece receiving sector, so that the positioning pillars move through this sector in a straight line parallel to the workpiece feeding path.

4 Claims, 14 Drawing Figures

BLOW MOLDING APPARATUS

SUMMARY OF THE INVENTION

The present invention relates to a blow molding apparatus and particularly to a rotary type blow of molding apparatus comprising a number of molds arranged on a turntable for successively gripping and blow molding a tubular workpiece such as a heated resin piper being continuously fed.

A main object of the present invention is to provide an arrangement wherein a portion of a resin pipe to be gripped by each individual mold on a turntable is caused to assume a proper attitude for grip by very simple means, so that the subsequent blowing operation can be positively and satisfactorily carried out.

Thus, the present invention provides a blow molding apparatus comprising a turntable disposed laterally of the path of delivery movement of a tubular workpiece being fed thereto, and a number of equidistantly spaced molds arranged on said turntable around the periphery thereof for successively gripping and blow molding said workpiece moving along said path of delivery movement, said apparatus being characterized in that said molds are arranged on a common circle tangential to said path of delivery movement, and an attitude correction member is arranged between adjacent molds whereby a portion of the workpiece to be gripped by a mold positioned on said path of delivery movement is corrected to assume a proper attitude for grip with respect to that mold.

With such arrangement of the present invention, which is very simple in that only a pillar-like attitude correction member is provided between adjacent molds, a portion of a workpiece to be gripped by each individual mold can be positioned in alignment with the centerline of the workpiece gripping space of the mold, thereby eliminating the disadvantage of the workpiece and mold undesirably pushing against each other and producing a strain in the workpiece during the gripping operation of the molds. As a result, a blow molded product of good quality is obtained.

According to a preferred embodiment of the present invention, workpiece cutting means is disposed between adjacent molds and two attitude correction members are disposed between adjacent molds with said cutting means therebetween so that a portion of the worpiece to be cut by said cutting means is also corrected to assume a proper attitude for being cut. According to such arrangement, no only is the cutting operation itself satisfactorily carried out, but also the detachment of the workpiece can be effected at a most suitable time independently of the operation of the mold.

Further, according to the present invention, the cutting means includes a pair of cutters each provided with a gripper for gripping a workpiece portion on each side of the cut location upon completion of cutting, said grippers acting to grip the remaining portions of the workpiece connected to both sides of a blow molded article, thereby preventing the blow molded article from adhering to the mold when the latter is opened, thus ensuring complete release of the article from the mold and improving the withdrawal thereof from the mold.

Another feature of the present invention is the provision of means for reciprocating said turntable in a direction at right angles to said path of delivery movement in order that a portion of the path of rotation of said attitude correction members which overlaps a workpiece portion in said path of workpiece delivery movement may be corrected to be a linear path parallel to said path of delivery movement.

According to such arrangement, during the time that the attitude correction member reaches a predetermined position, a workpiece being delivered in the path of delivery movement and stretched by the preceeding mold can be prevented from being stretched with a lateral deviation by the attitude correction member. Therefore, the workpiece can be stretched uniformly and fed into the mold as a homogineous unidirectional stretched pipe, so that articles of good quality produced by the biaxial stretch blow molding can be provided.

Other numerous features and merits of the present invention will be readily understood from the following description of preferred embodiments of the invention shown in the accompanying drawings.

Figure 1:
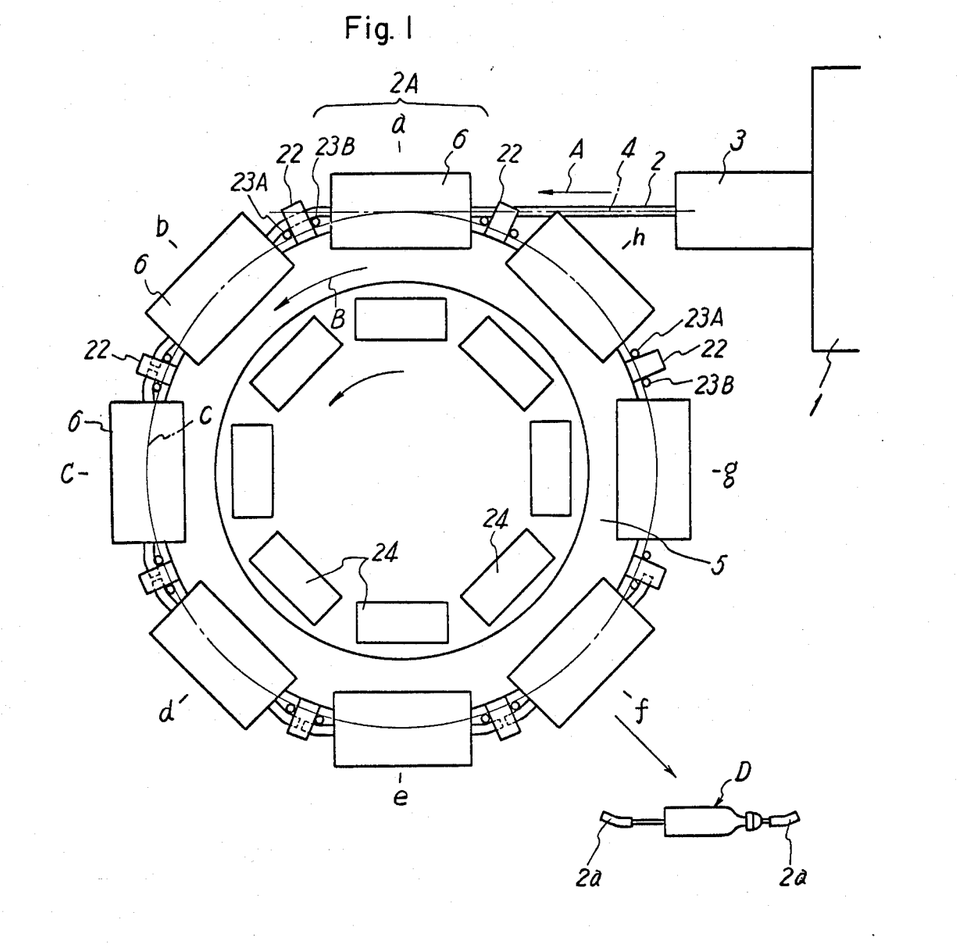
FIG. 1 is a schematic plan view of one embodiment of the apparatus in its entirety.

DESCRIPTION OF THE PREFERRED EMBODIMENTS:

In FIG. 1, a resin pipe workpiece 2 heated by a heater 1 is delivered in the linear path of delivery movement 4 through a draw cone 3. A turntable 5, disposed laterally of said path of delivery movement, is continuously or intermittently rotated in the direction B corresponding to the direction of delivery A of the resin pipe. A number of biaxial stretch blow molds 6 (eight molds in the case of the apparatus shown) are mounted on said turntable 5 at equal angular intervals on a common circle C arranged tangentially to said path of delivery movement 4.

Figure 2:
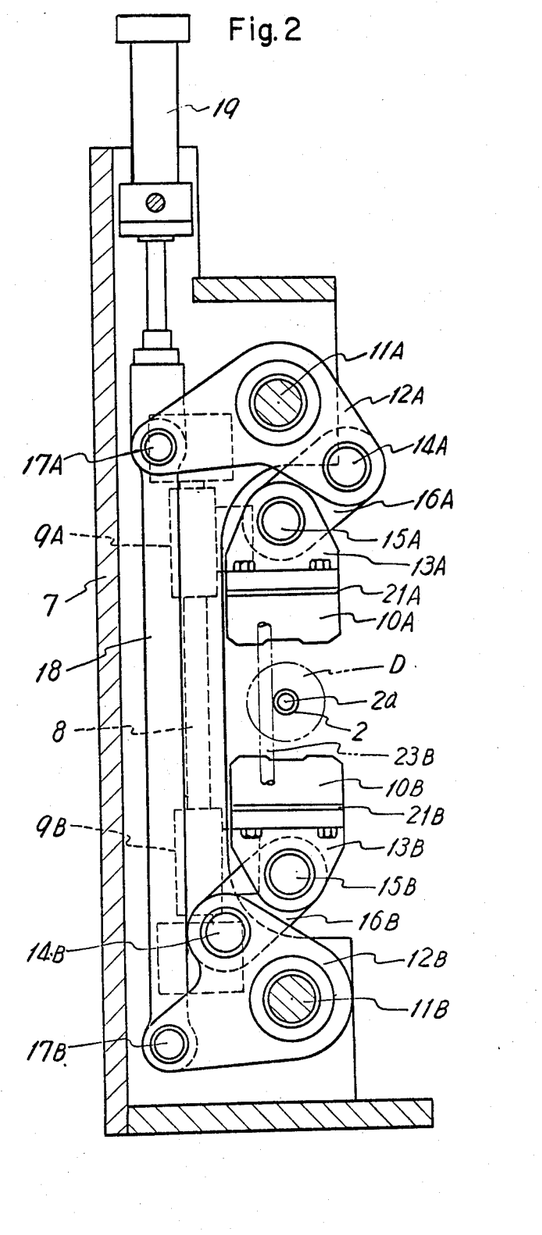
FIG. 2 is a sectional side elevation showing a mold in its open position.
Figure 3:
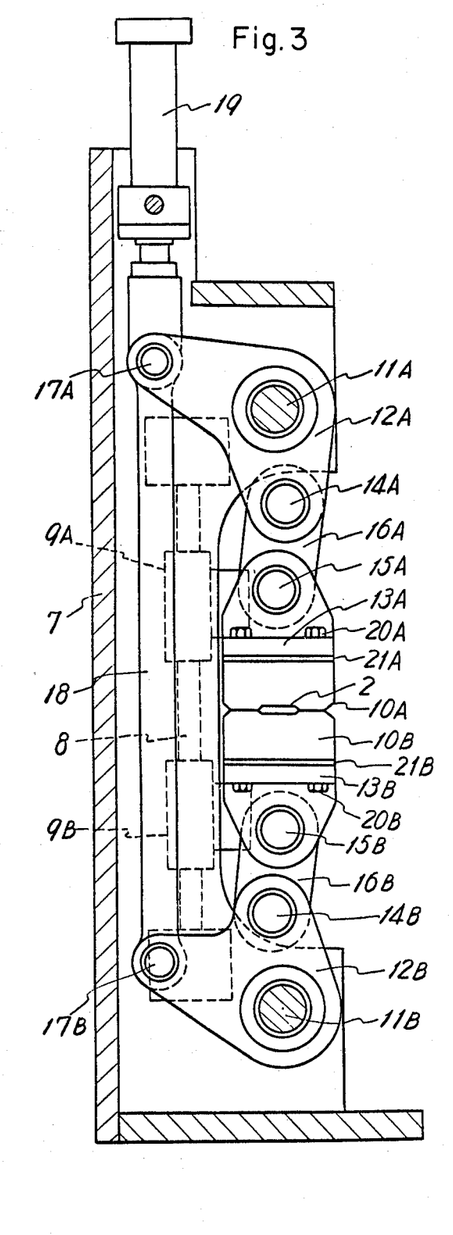
FIG. 3 is a side elevation similar to FIG. 2 but showing the mold in its closed position.
Figure 4:
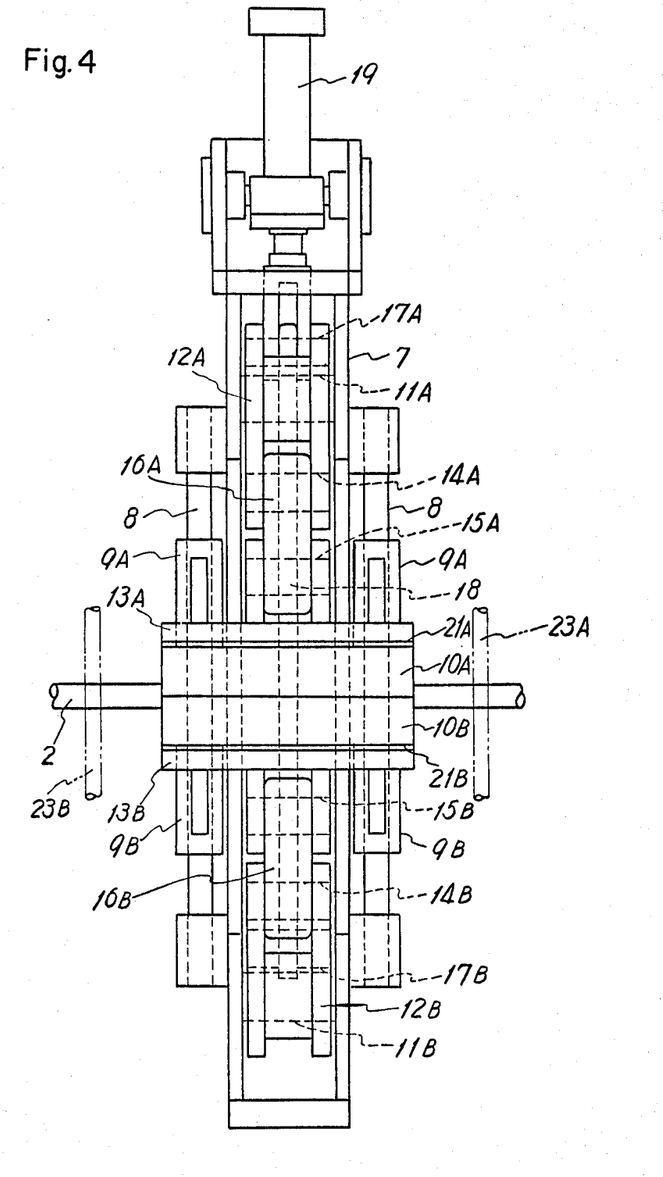
FIG. 4 is a front elevation of the mold in its closed position.

Each such mold 6, as shown in FIGS. 2–4, comprises a frame 7 integral with said turntable 5, a pair of horizontally spaced vertical rods 8, upper and lower mold halves 10A and 10B attached to said vertical rods by tubular sleeves 9A and 9B so as to be movable toward and away from each other, swing links 12A and 12B pivotally connected to said frame 7 through first transverse shafts 11A and 11B outside said mold halves, intermediate links 16A and 16B for relatively swingably connecting one of the respective ends of the swing links 12A and 12B to supports 13A and 13B through second transverse shafts 14A and 14B and third transverse shafts 15A and 15B, a lifting rod 18 to which the other ends of said swing links 12A and 12B are relatively swingably connected through fourth transverse shafts 17A and 17B and which is movable up and down along the path of movement of said mold halves, and cylinder means 19 for effecting the up and down movement of said lifting rod 18. The pivots between said swing links 12A, 12B and intermediate links 16A, 16B, namely, the second transverse shafts 14A, 14B, are positioned one above the other and oppositely equidistant from the center of the resin pipe 2, so that the up and down movement of said lifting rod 18 causes the mold halves 10A and 10B to be moved toward and away from each other. Bolts 20A, 20B connect said supports 13A, 13B and mold halves 10A, 10B and the adjustment of the molding center can be made by changing the thickness of liners 21a and 21B inserted therebetween.

As shown in FIG. 1, resin pipe cutting means 22 is provided laterally of said molds, i.e., between adjacent molds 6. Attitude correction members 23A and 23B are positioned between adjacent molds 6 on both sides of the cutting means 22, whereby when a mold 6 is aligned with the path of delivery movement 4, a resin pipe portion 2A corresponding to said mold 6 is controlled to assume a properly corrected attitude for grip with respect to that mold 6. In addition, a mold at position a is in a resin pipe gripping position and a mold at positoin f is in a molded article removing position, and between these two positions there are positions b, c, d and e where bottle molding, cutting and cooling and carried out.

The removal of a bottle D is carried out by air pressure produced upon actuation of blower means 24 attached to the turntable 5 and associated with the respective molds 6.

The production of bottles by the biaxial stretch blow molding process will now be described.

In FIG. 1 the resin pipe 2 delivered from the draw cone 3, and stretched by a mold 6 moving toward the molding position b, enters between the opened halves 10A and 10B of a mold 6 arriving at the gripping position a. When such mold 6 is aligned with the path of delivery movement 4 at said gripping position a, equivalent portions at opposite ends of the resin pipe portion 2A associated with said mold abut against the attitude correction members 23A and 23B positioned on both sides of said mold, whereby the portion 2A is prevented from being displaced toward the center of the turntable, as be tension produced by a mold 6 at the gripping position b, and is maintained in a proper attitude with respect to the mold. In such condition, the cylinder means 19 which has been extended (as shown in FIG. 2) is then retracted, whereupon the lifting rod 18 is lifted to swing the swing links 12A, 12B clockwise around the axes of the first transverse shafts 11A, 11B, thereby moving the second transverse shafts 14A and 14B toward the center of the resin pipe. As a result, the mold halves 10A, 10B are moved toward each other through the intermediate links 16A, 16B while being guided by the vertical rods 8, thereby gripping the resin pipe portion 2A therebetween, as shown in FIGS. 3 and 4.

During movement from position b to position e in FIG. 1, such mold 6 forms a bottle D therein by biaxial blow stretch molding. A pipe portion existing between a mold 6 and a succeeding mold 6 which is in the position b is cut by the cutting means 22. In addition, the preceding pipe portion has already been cut in the preceding stage. The cooling of the resin pipe portion thus cut is then carried out. When the mold 6 reaches the mold opening position e, the mold halves 10A and 10B are moved away from each other by extending the cylinder means 19 of the mold 6, with the resin pipe portion being gripped by resin pipe cut end holding means installed on said cutting means, as described below. In such condition, the mold 6 reaches the bottle removing position f, where the grip on the resin pipe ends is released, whereupon the molded bottle is blown off by the air blast from the blower means 24. The mold 6 then reaches the gripping position a agains via preparatory positions g and h.

In addition, even if only one of the attitude correction members, 23B and 23A, is provided, the same function can be obtained.

The construction of the cutting means 22 will now be described with reference to FIGS. 5 through 8.

Figures 5, 6:
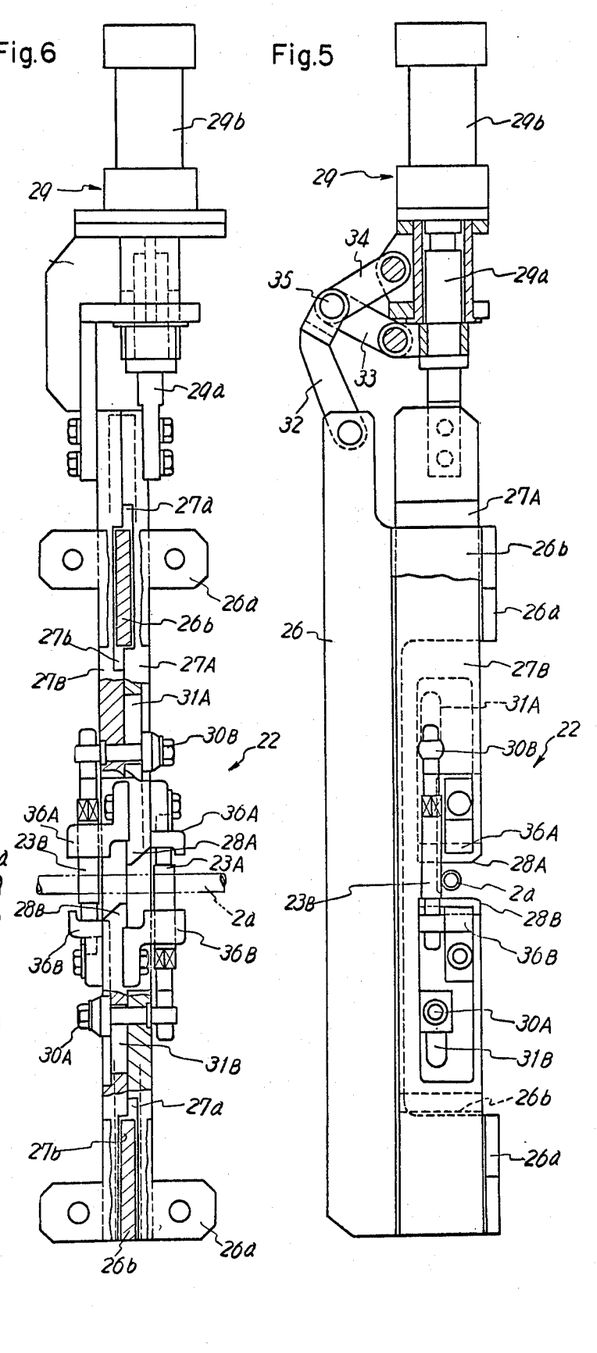
FIG. 5 is a side elevation of cutting means.
FIG. 6 is a plan view of said means shown partly in section.
Figure 7:
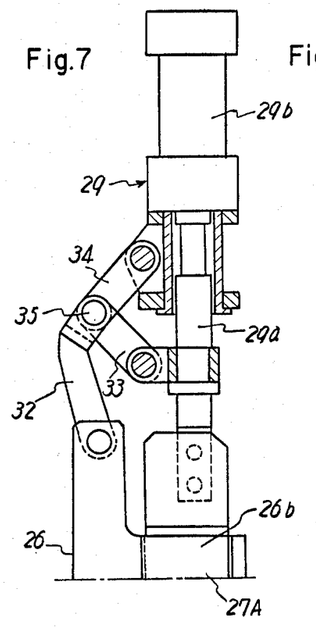
FIGS. 7 and 8 are fragmentary views corresponding to FIGS. 5 and 6, respectively, and showing a cutting operation.

The cutting means 22 comprises a frame 26 fixed to said turntable 5 through flange portions 26a, a pair of slide plates 27A and 27B having recesses 27a and 27b positioned on both sides of flat plates 26b of the frame 26, a pair of cutter blades 28A and 28B formed on said slide plates, and cylinder means 29 for sliding the slide plates in opposite directions. The slide plates 27A, 27B are slidably secured to said flat plates 26b. A bolt 30A fixed to one slide plate 27A extends through an elongated opening 31B formed in the other slide plate 27B, while a bolt 30B fixed to the other slide plate 27B extends through an elongated opening 31A formed in one slide plate 27A, thereby securing parallelism during sliding movement of the slide plates as well as grip attitude. The piston stem 29a of said cylinder means 29 is connected to the slide plate 27A and also to a swing link 32 through a first intermediate link 33, said swing link being pivoted to the frame 26, and the cylinder body 29b is connected to the other slide plate 27B and also to said swing link 32 through a second intermediate link 34. The two intermediate links 33 and 34 are connected to the swing link 32 through a common transverse shaft 35. Therefore, the extension and retraction of the cylinder means 29 causes the two slide plates 27A and 27B to slide in opposite directions to move to two cutter blades 28A and 28B toward and away from each other. These cutter blades 28A and 28B are formed on the opposed ends of recesses formed in said slide plates 27A and 27B. The sides of the cutter blades have grippers 36A and 36B attached thereto by bolts for gripping the remaining portions 2a of the cut resin pipe leading to opposed ends of the molded bottles D.

The operation of the cutting means is as follows.

Figure 8:
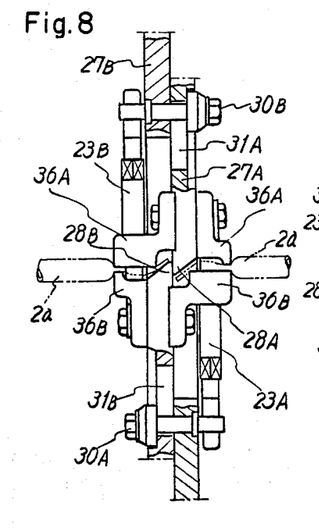

While a mold 6 is moving from position b to position e, a resin pipe 2 gripped by said mold is blow molded into a bottle shape, as described above. A resin pipe portion 2a existing between molds in the positions b and c is positioned between the opened cutter blades 28A and 28B as shown in FIGS. 5 and 6, and is supported by the attitude correction members 23A and 23B. In such condition, the cylinder means 29 is extended. Since such extension causes the rotation of the two intermediate links 33 and 34 around the axis of the transverse shaft 35, it results in forward movement of the piston stem 29a and rearward movement of the cylinder body 29b, sliding the two slide plates 27A and 27B in opposite directions to move the cutter blades toward each other, thereby cutting the resin pipe portion 2a at an intermediate point thereof, as shown in FIG. 8. The grippers 36A and 36B, integral with the cutter blades, grip the opposite sides of the cut portion. The cylinder means 29 is then retracted to open the grippers 36A and 36B, so that the contraction, due to cooling of the resin pipe portion 2a cut off and projecting from the mold, is prevented from affecting the molded bottle within the mold. Before the mold 6 reaches the position f, the cylinder means 29 of the cutting means 22 positioned on both sides of the mold 6 are extended again, so that the remaining portions 2a of resin pipe extending from both sides of the molded bottle are gripped by the grippers 36A and 36B again, as shown in FIG. 8. In such condition, the cylinder means 19 is extended to move the mold halves 10A and 10B away from each other. At this time, since the remaining portions 2a of resin pipe at both ends are gripped by the grippers 36A and 36B, the bottle D is separated from the mold and is positioned at the center of the distance between the mold halves 10A and 10B without being moved by adherence to the mold halves, as shown in phantom lines in FIG. 2. In such condition, the mold reaches the bottle removing position f, where the retraction of the cylinder means 29 opens the grippers 36A and 36B so that the molded bottle D is blown off by the air blast from the blower means 24.

next, another embodiment shown in FIGS. 9 through 14 will be described.

Figure 9:
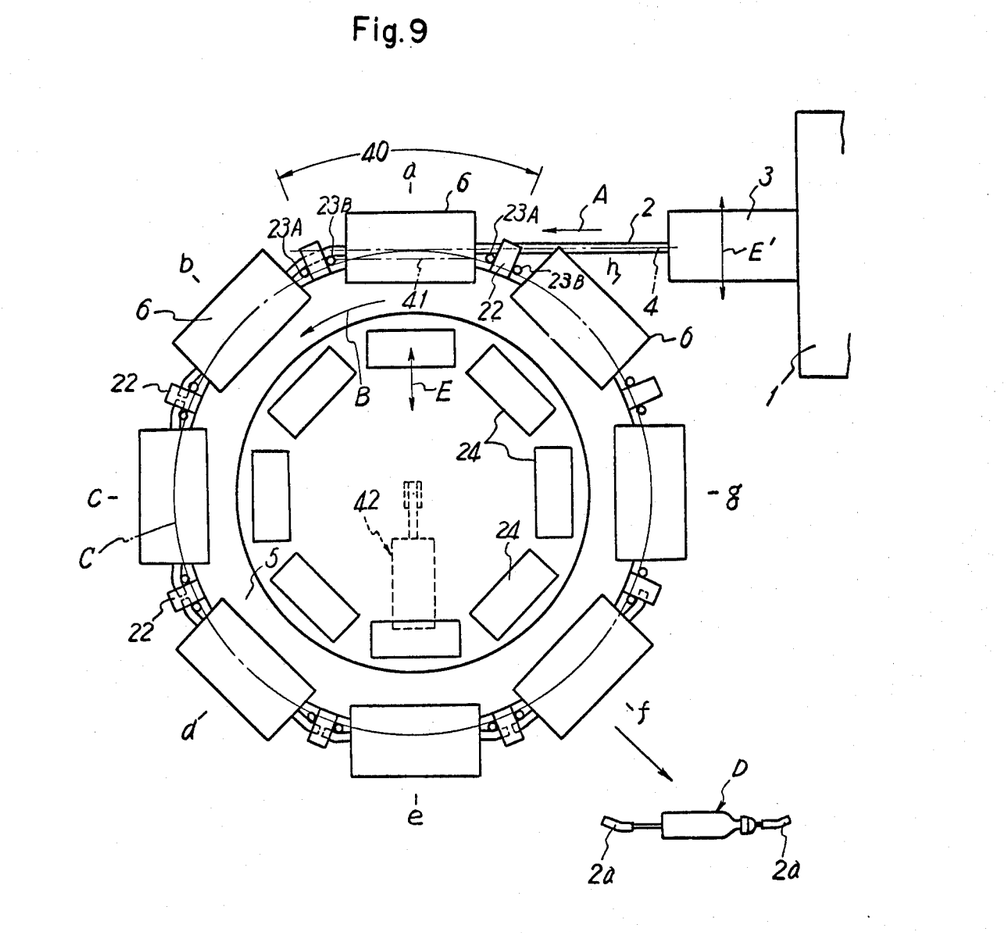
FIG. 9 is a schematic plan view of another embodiment of the present invention.

In this embodiment, in order that a portion of the path of rotation of said attitude correction members 23A and 23B which overlaps a resin pipe portion in said path of delivery movement 4, i.e., a portion 40 of the path of rotation which extends from the initial end to the terminal end of the gripping position a, may be corrected to be a linear path 41 parallel to said path of delivery movement, there is provided means 42 for reciprocating said turntable 5 in directions E at right angles to the path of delivery movment 4.

The reciprocating means 42 (FIGS. 10-13) comprises a driving shaft 44 supported in a fixed frame 43, a swing link 46 pivotally mounted at an intermediate portion thereof on a transverse shaft 45 fixed to the fixed frame, a crank link 47 for relatively swingably connecting the upper end of said swing link 46 and an eccentric portion 44a of said driving shaft 44, a movable member 49 which is capable of reciprocating in said right-angle directions E as guided by a plurality of rollers 48 rotatably mounted on said fixed frame 43, and an intermediate link 50 for relatively swingably connecting the rear end of the movable member 49 and the lower end of the swing link 46. One end of the movable member 49 is connected to a movable body 51 which rotatably supports the turntable 5. A pivot shaft 52 for said crank link 47 and swing link 46 is adapted to be variable in position through a threaded adjusting mechanism 53. Further, when the movable body 51 is moved in the directions E, it is guided as by a combination of wheels and rails.

Figures 10, 11, 12, 13:
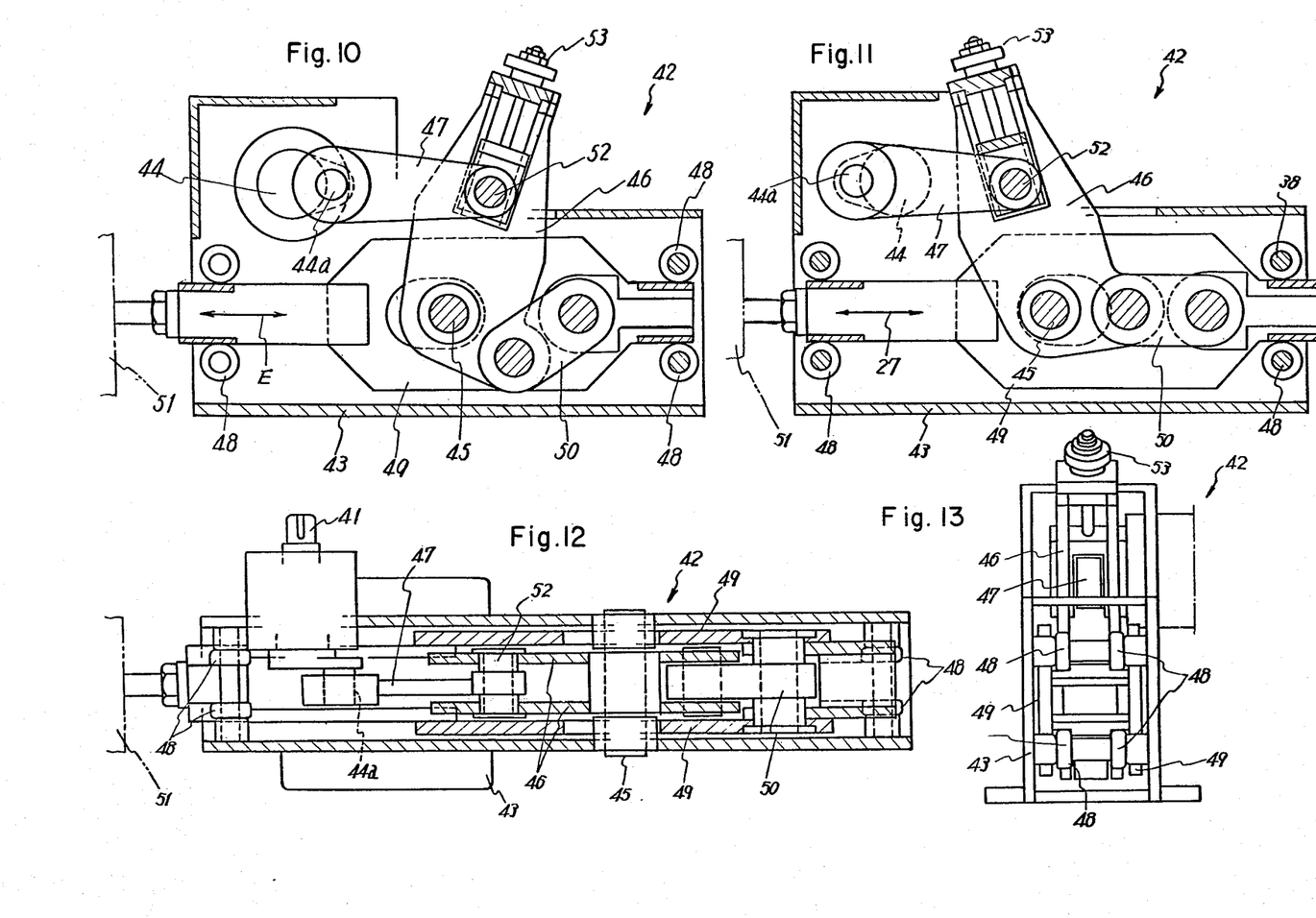
FIGS. 10 and 11 are sectional side elevations showing the operation of turntable reciprocating means in the apparatus of FIG. 9.
FIG. 12 is an cross-sectional plan view of the reciprocating means.
FIG. 13 is an end elevation of the same.
Figure 14:
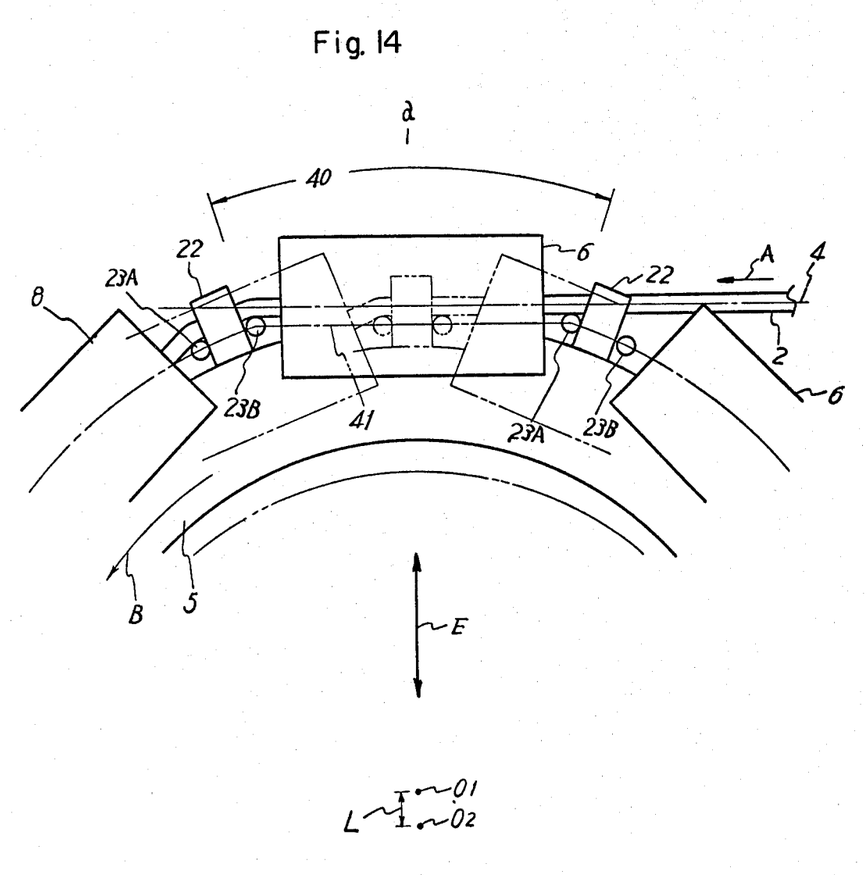
FIG. 14 is an enlarged schematic plan view showing the operation of the apparatus of FIG. 9.

The arrangement of the reciprocating means 42 is such that the driving shaft 44 makes one revolution from the time one attitude correction member 23A enters the rotary path portion 40 till the time the attitude correction member 23B positioned rearwardly adjacent to the attitude correction member 23A leaves the rotary path portion 40. When the attitude correction member 23A is at the entrance to the rotary path portion 40 as shown in solid lines in FIG. 14, the movable member 49 is in its fully advanced position as shown in FIG. 10, bringing the center of rotation of the turntable 5 to $O_1$ in FIG. 14. In such condition, as a mold 6 is moved toward the gripping position a, the eccentric shaft portion 44a is rotated around the axis of the driving shaft 44 to swing the swing link 46 around the axis of the transverse shaft 45 and gradually retract the movable member 49 through the intermediate link 50. Consequently, the turntable 5 is gradually spaced from the path of delivery movement 4 while being rotated. As a result, the amount of movement of the attitude correction member 23A in the outward direction E due to the rotation around the center $O_1$ is cancelled by the amount of its movement in the inward direction E due to the retraction of said center $O_1$, so that it moves in the linear path 41 parallel to the path of delivery movement 4. When the attitude correction members 23A and 23B reach the center of the gripping position as shown in phantom lines in FIG. 14, the movable member 49 is in its fully retracted position as shown in FIG. 11, with the center of rotation at $O_2$. From this position, the turntable coninues to advance, so that the amount of movement of the attitude correction member 23A in the inward direction E due to the rotation around the center $O_2$ is cancelled by the amount of its movement in the outward direction E due to the movement of the center toward $O_1$. As a result, the attitude correction member 23B continues to move in the linear path 41. In this way the attitude correction members 23A and 23B, which correct the attitude of the resin pipe 2, move in the linear path 41 while supporting the resin pipe 2, so that there is no possibility that the resin pipe 2 being delivered from the draw cone 3 will be laterally deviated. The amount of movement of the turntable, which is the distance L between the centers $O_1$ and $O_2$, can be optionally changed by manipulating the threaded adjusting mechanism 53.

While the above embodiment refers to a system wherein the turntable 5 is moved in the directions E, a different system may be used wherein the draw cone 3 is moved in the directions E' as shown in FIG. 9. Further, the reciprocating mechanism 42 is preferably is in the form of a link mechanism as shown in the embodiment, but other forms utilizing cylinder means and the like may be used.

We claim:

1. In blow molding apparatus including a rotatary turntable, a plurality of blow molds arranged on the turntable at equally spaced intervals around a common circle; and means for feeding a heated tubular workpiece to the blow molds in a feed path tangential to the common circle on which the blow molds are mounted; each blow mold having upper and lower mold halves and drive means for relatively moving the mold halves between opened and closed positions, the mold halves in the closed position gripping a portion of the workpiece; the improvement wherein workpiece cutting means are mounted on the turntable between adjacent blow molds, each cutting means being actuated by drive means separate from said drive means for relatively moving the mold halves whereby the workpiece is cut between adjacent blow molds after being gripped thereby, each cutting means includes a pair of cutter blades each provided with a gripper for gripping respective workpiece portions on both sides of the cut location upon completion of cutting, and a pair of attitude correction members are arranged between adjacent blow molds on either side of each cutting means whereby a workpiece portion to be cut by the cutting means can also be controlled to have a proper attitude for being cut.

2. Blow molding apparatus as set forth in claim 1 further comprising means for reciprocating said turntable in a direction at right angles to said path of delivery movement, whereby a portion of the rotary path of said attitude correction members which overlaps a workpiece portion in said path of delivery movement is corrected to be a linear path parallel to said path of delivery movement.

3. In blow molding apparatus including a rotary turntable, a plurality of blow molds arranged on the turntable at equally spaced intervals around a common circle; and means for feeding a heated tubular workpiece to the blow molds in a feed path tangential to the common circle on which the blow molds are mounted; each blow mold having upper and lower mold halves and drive means for relatively moving the mold halves between opened and closed positions, the mold halves in the closed position gripping a portion of the workpiece; the improvement wherein at least one attitude correction member is arranged between adjacent blow molds whereby the feed path of a portion of the workpiece to be gripped by a blow mold is corrected to assume a proper attitude for grip with respect to that blow mold, workpiece cutting means are mounted on the turntable between adjacent blow molds, each cutting means being actuated by drive means separate from said drive means for relatively moving the mold halves whereby the workpiece is cut between adjacent blow molds after being gripped thereby, and each of said workpiece cutting means is provided with grippers for gripping the workpiece on opposite sides of the cutting position whereby when the upper and lower halves of a blow mold are moved to said open position, the workpiece is engaged by the grippers of cutting means on either side of the opened mold halves.

4. In blow molding apparatus including a rotary turntable, a plurality of blow molds arranged on the turntable at equally spaced intervals around a common circle; and means for feeding a heated tubular workpiece to the blow molds in a feed path tangential to the common circle on which the blow molds are mounted; each blow mold having upper and lower mold halves, and drive means for relatively moving the mold halves between opened and closed positions, the mold halves in the closed position gripping a portion of the workpiece; the improvement wherein workpiece cutting means are mounted on the turntable between adjacent blow molds, each cutting means being actuated by drive means separate from said drive means for relatively moving the mold halves whereby the workpiece is cut between adjacent blow molds after being gripped thereby, and each of said workpiece cutting means is provided with grippers for gripping the workpiece on opposite sides of the cutting position whereby when the upper and lower halves of a blow mold are moved to said open position, the workpiece is engaged by the grippers of cutting means on either side of the opened mold halves.

* * * * *